(12) United States Patent
Nagata

(10) Patent No.: US 6,620,042 B1
(45) Date of Patent: *Sep. 16, 2003

(54) TARGET-GAME EXECUTION METHOD, GAME MACHINE, AND RECORDING MEDIUM

(75) Inventor: Akihiko Nagata, Tokyo (JP)

(73) Assignee: Konami Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,542

(22) Filed: Jun. 9, 2000

(30) Foreign Application Priority Data

Jun. 12, 1999 (JP) .......................................... 11-202123

(51) Int. Cl.⁷ ............................................... A63F 13/00
(52) U.S. Cl. ............................................ 463/5; 463/36
(58) Field of Search .............................. 463/40, 50, 53, 463/56, 43, 1–4, 5, 23, 49, 30–32; 273/317.6, 348, 371

(56) References Cited

U.S. PATENT DOCUMENTS

| | | | |
|---|---|---|---|
| 4,008,893 A | * 2/1977 | Yoseloff | 463/2 |
| 4,099,719 A | * 7/1978 | Dean et al. | 235/411 |
| 4,195,838 A | * 4/1980 | Santandrea et al. | 273/88 |
| 4,240,632 A | * 12/1980 | Watanabe | 273/88 |
| 4,324,402 A | * 4/1982 | Klose | 273/88 |
| 4,372,557 A | * 2/1983 | Del Principe et al. | 273/88 |
| 4,381,864 A | * 5/1983 | Bromley et al. | 273/88 |
| 4,969,647 A | 11/1990 | Mical et al. | |
| 5,120,057 A | 6/1992 | Kitaue | |
| 5,137,277 A | * 8/1992 | Kitaue | 273/85 G |
| 5,184,830 A | * 2/1993 | Okada et al. | 273/433 |
| 5,190,286 A | 3/1993 | Watanabe et al. | 273/85 G |
| 5,419,549 A | * 5/1995 | Galloway et al. | 473/455 |
| 5,435,554 A | * 7/1995 | Lipson | 463/3 |
| 5,478,077 A | * 12/1995 | Miyahara | 273/185 R |
| 5,599,017 A | * 2/1997 | Bixler et al. | 473/436 |
| 5,601,487 A | * 2/1997 | Oshima et al. | 463/4 |
| 5,795,224 A | * 8/1998 | Yoshida | 463/2 |
| 6,325,715 B1 | * 12/2001 | Nagata | 463/36 |

FOREIGN PATENT DOCUMENTS

| | | |
|---|---|---|
| DE | 29710637 | 9/1997 |
| DE | 29713965 | 10/1997 |

OTHER PUBLICATIONS

Tiger Electronics, LTD. TM, Model 66–002 Instruction Manual, 1998, Tigertoys.com, p. 1–3.*
Tiger Electronics, LTD. TM, Baseball Model 75–014 Mini Tiger Games TM Advertisement, 1997, p. 1.*
Tiger Electronics, LTD. TM, Baseball Model 7–41 Mini Tiger Games TM Advertisement, 1998, p. 1.*
Links 386CD Players Manual, 1995, Access Software, Inc., pp. 32–33.*

* cited by examiner

*Primary Examiner*—Paul T. Sewell
*Assistant Examiner*—Scott E. Jones
(74) *Attorney, Agent, or Firm*—Bachman & LaPointe, P.C.

(57) ABSTRACT

A portable game machine electronically executes target games and has an input unit, a game processing unit, and a display unit in a housing. A plurality of targets to be hit are displayed on the display unit. First kicking data concerning an X coordinate when a ball reaches one of the targets and second kicking data concerning a Y coordinate when the ball reaches one of the targets are successively input by the game player through one of the operation keys provided for the input unit. By using the information of the first kicking data and the second kicking data, the game processing unit determines whether the ball hits one of the targets defined by the X coordinate and the Y coordinate. Based on the determination result, an image of the target after the ball has been kicked is displayed on the display unit.

11 Claims, 7 Drawing Sheets

| TARGET | Y COORDINATE | X COORDINATE |
|--------|--------------|--------------|
| M1 | 10~11 | 7~9 |
| M2 | 8~9 | 8~9 |
| M3 | 3~4 | 8~9 |
| M4 | 1~2 | 7~9 |
| M5 | 10~11 | 2~6 |
| M6 | 8~9 | 3~4 |
| M7 | 3~4 | 3~4 |
| M8 | 1~2 | 2~6 |
| M9 | 5~6 | 5~6 |

FIG. 7

TARGET-GAME EXECUTION METHOD, GAME MACHINE, AND RECORDING MEDIUM

BACKGROUND OF THE INVENTION

1. Field of the Invention

The present invention generally relates to computer game techniques and, more particularly, to a computer game technique implementing a target game in which a plurality of targets shown on a display unit are hit with balls.

2. Description of the Related Art

Target games often performed at fairs have been popular for a long time. Games in which targets are aimed at and hit from a distance with a gun or a ball (target games) require high concentration and thus highly stimulate people, thereby engaging players in the game. Generally, in this type of game, targets are set at a distance and are hit by shooting or throwing a ball. In particular, target games which require players to throw a ball to hit targets are highly entertaining.

With the recent progress of technology, many kinds of game machines utilizing electronic circuits have been proposed. These types of game machines are usually formed of an input unit operated by game players, a game processing unit for executing game processing in response to an operation input through the input unit, and a display unit presenting the executed result of the game processing unit to the game players.

Among the above types of machines, some machines are portable in which the input unit, the game processing unit, and the display unit are stored in a portable housing. There is an increasing demand for developing attractive games for use in the portable game machines, as well as in the other types of game machines. However, a higher restriction on the hardware, including a storage unit, is imposed on the portable game machines than on the other types of game machines, which makes it difficult to develop highly entertaining and attractive games.

Under these circumstances, although the target games, which are highly entertaining, are very attractive games, a specific method for performing the target games on game machines is not known.

SUMMARY OF THE INVENTION

Accordingly, in view of the above background, it is an object of the present invention to provide a target-game execution method for electronically executing a target game on a game machine, a game machine for executing the target game, and a recording medium for implementing the target-game execution method on a computer.

In order to achieve the above object, according to one aspect of the present invention, there is provided a target-game execution method for use in a portable game machine which includes an input unit operated by a game player, a game processing unit for executing game processing based on an operation input from the input unit, and a display unit for providing an execution result executed by the game processing unit to the game player. The target-game execution method includes the steps of: displaying a plurality of targets on the display unit; determining by the game processing unit by using first kicking data and second kicking data successively input by the game player through the input unit, one of the first kicking data and the second kicking data being used as information concerning an X coordinate when the ball reaches one of the targets, and the other data being used as information concerning a Y coordinate when the ball reaches one of the targets, whether a ball hits one of the plurality of targets defined by the X coordinate and the Y coordinate; and displaying a resulting image of the target on the display unit after the ball has been kicked based on a determination result obtained by the game processing unit.

That is, in this target-game execution method, only by using the first kicking data and the second kicking data successively input by the game player, it can be determined whether a ball kicked by the game player has reached the aimed target. It is thus possible to determine whether the ball has hit the aimed target, thereby implementing the game without performing complex processing. The term "kicking" in this specification includes all kinds of action using balls, such as kicking a ball, throwing a ball, hitting a ball, flying a ball to a target, etc.

In this target-game execution method, when the X coordinate and the Y coordinate obtained when the ball hits the target represent a boundary between adjacent targets which have not been hit before, the game processing unit may determine that the ball hits the adjacent targets. Accordingly, by making the game player hit a plurality of targets, the entertaining characteristics of the game can be enhanced.

The aforementioned target-game execution method can be executed without determining an aimed target in advance. However, if the game player is required to input the first kicking data and the second kicking data after determining the aimed target, the player tries to precisely input the data, thereby making the target game more entertaining.

Accordingly, the target-game execution method may further include the steps of: selecting an aimed target by the game player through the input unit; and displaying an image indicating the game player's luck on the display unit when a target other than the aimed target is hit.

With this arrangement, even if the ball kicked by the player has not hit the aimed target, it may hit a target positioned to which the ball has been displaced. This is fortunate for the player, and an image representing the player's luck is displayed, thereby enhancing the entertaining characteristics of the game.

When the ball reaching the target determined by the first kicking data and the second kicking data is positioned within a target which has been hit before, the game processing unit determines that the ball has not hit the target. Instead, an image indicating that the ball has passed through the target may be displayed on the display unit. This makes the player more regretful for the failure, thereby enhancing the entertaining characteristics of the game. The condition for hitting a plurality of targets, a target other than the aimed target, or the ball passing through a target which has been hit before is not restricted to the above-described condition. Another condition may be set, or it may be set that the above-described incidences occur with a certain probability.

The first kicking data and the second kicking data generally indicate the timing at which the player operates the input unit though they may vary according to the type of input unit. Accordingly, the target-game execution method may further include the steps of: displaying gauges on the display unit, each of the gauges being formed by continuously arranging a plurality of small regions in a predetermined direction; and displaying timing information on the gauges as a guide for the game player for inputting the first kicking data and the second kicking data.

In this case, the timing information may be displayed in such a manner that a designated region is shifted on the gauges by successively displaying the plurality of small regions of the gauges.

In this case, the gauges may be located on the display unit so that one of the gauges is in parallel to the X axis and the other gauge is in parallel to the Y axis, and the first kicking data and the second kicking data may be determined by the positions of the designated regions within the gauges when the game player operates the input unit. With this arrangement, the positions of the designated region on the gauges directly correspond to the positions of the target. This enables the game player to clearly see the timing at which the first kicking data and the second kicking data are to be input.

The target-game execution method may further include the steps of: determining by the game processing unit that the game is a success when all the targets have been hit within a predetermined limited number of balls, and determining that the game is a failure when not all the targets have been hit within the predetermined limited number of balls; and displaying an image representing the success of the game when the game is found to be a success.

Thus, the main purpose of this game is whether all the targets can be hit within a determined number of balls, and the corresponding image is displayed on the display unit. This increases the feeling of achievement when the game has resulted in success, thereby making the game more entertaining. In this method, an image of the failure of the game, as well as the image of the success, may be displayed on the display unit when the game processing unit determines that the game is a failure.

According to another aspect of the present invention, there is provided a game machine including: an input unit operated by a game player; a game processing unit for executing game processing based on an operation input from the input unit; and a display unit for providing an execution result executed by the game processing unit to the game player. The game processing unit displays a plurality of targets on the display unit, and determines by using first kicking data and second kicking data input by the game player through the input unit one of the first kicking data and the second kicking data being used as information concerning an X coordinate at which the ball reaches one of the targets, and the other data being used as information concerning a Y coordinate at which the ball reaches one of the targets, whether the ball hits one of the targets defined by the X coordinate and the Y coordinate. The game processing unit displays a resulting image of the target on the display unit after the ball has been kicked based on a determination result obtained by the game processing unit.

The game processing unit of this game machine may be provided with the functions implementing the operations and advantages of the game executing method.

In the above-described game machine, the input unit, the game processing unit, and the display unit may be contained in a portable housing. This makes the game machine portable and handy, and in combination with the kicking game, the game becomes more entertaining.

The aforementioned target-game execution method can be implemented by reading program code recorded in a recording medium by a computer including a predetermined display unit and an input unit operated by a game player.

According to a further aspect of the present invention, there is a provided a computer-readable recording medium in which program code for operating a computer as a game machine is recorded, the computer including a predetermined display unit and an input unit operated by a game player. The program code causes the computer to execute the steps of: displaying a plurality of targets on the display unit; determining by using first kicking data and second kicking data successively input by the game player through the input unit, one of the first kicking data and the second kicking data being used as information concerning an X coordinate when the ball reaches one of the targets, and the other data being used as information concerning a Y coordinate when the ball reaches one of the targets, whether a ball hits one of the plurality of targets defined by the X coordinate and the Y coordinate; and displaying a resulting image of the target on the display unit after the ball has been kicked based on a determination result obtained by the game processing unit.

The term "program code" in the specification encompasses the broadest concept of code, such as data required for causing a game machine to execute the target game, control parameter, etc., in addition to the program itself.

DESCRIPTION OF THE PREFERRED EMBODIMENTS

Figure 1:
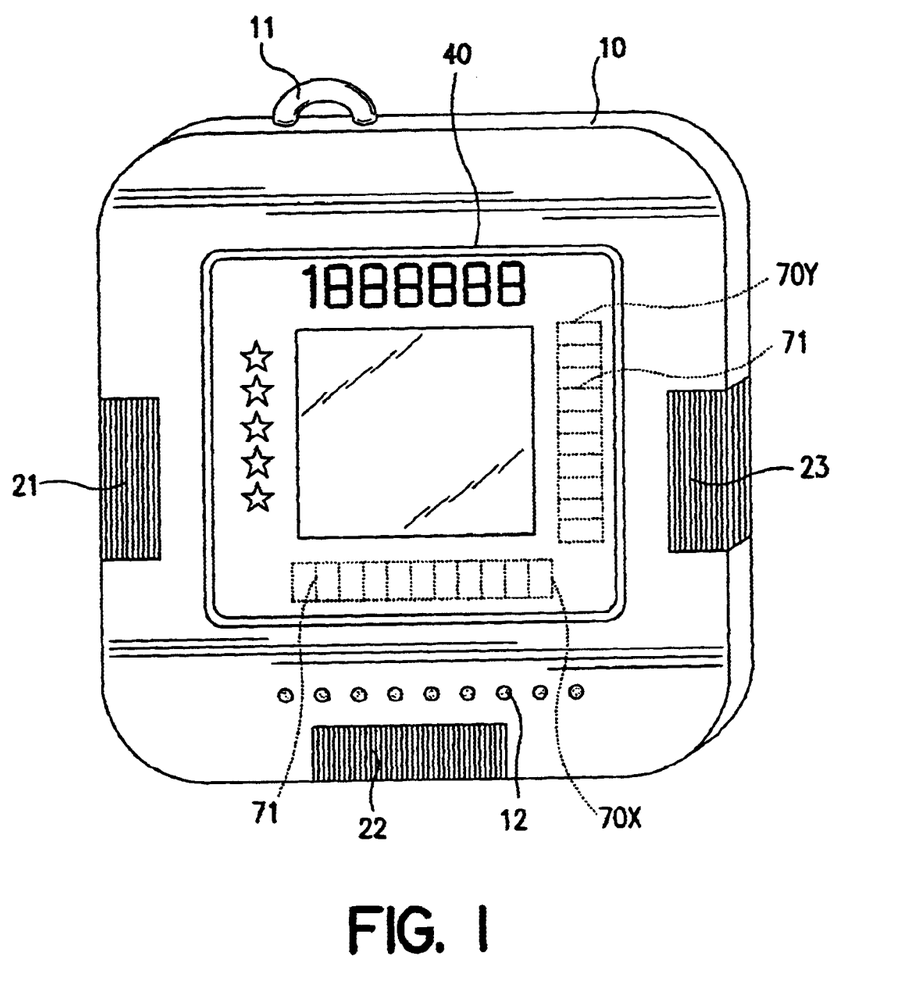
FIG. 1 is a perspective view illustrating the external configuration of a portable game machine according to an embodiment of the present invention.
Figure 2:
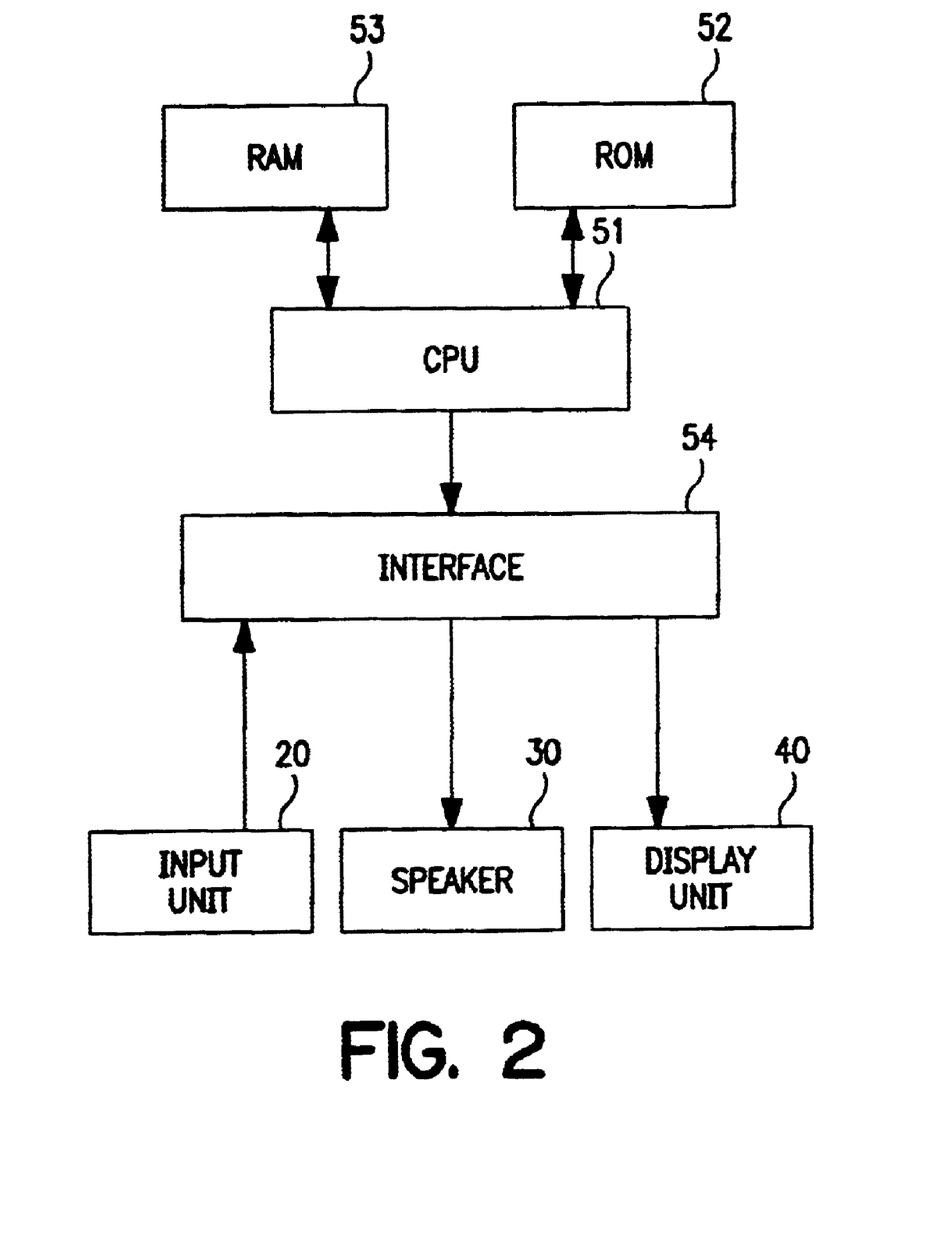
FIG. 2 illustrates the internal configuration of the portable game machine shown in FIG. 1.

The present invention is described in detail below with reference to the accompanying drawings through illustration of preferred embodiments. A description is first given, with reference to FIGS. 1 and 2, of a target-game execution method executed by a portable game machine. More particularly, FIG. 1 illustrates the external appearance of the portable game machine, and FIG. 2 illustrates the internal configuration of the game machine. There are many types of target games, and in this embodiment, the target game is discussed in the context of a kicking game.

The portable game machine is formed, as shown in FIGS. 1 and 2, in which an input unit 20, a speaker 30, and a display unit 40 are provided in a housing 10. The housing 10 is formed to be small enough to be held in a hand. At the top of the housing 10, a semi-circular hook 11 for connecting the game machine to, for example, a chain attached to a key holder, is provided.

The input unit 20 is formed of three operation keys 21, 22, and 23 attached to lateral surfaces and the bottom surface of the housing 10. The display unit 40 is, for example, a dot-matrix-type liquid crystal display, and the display surface is formed generally in a rectangular shape. A plurality of speaker holes 12 for outputting sound from the speaker 30 are formed below the display unit 40 at the bottom portion of the housing 10.

Inside the portable game machine, as shown in FIG. 2, a central processing unit (CPU) 51, a read only memory (ROM) 52, a random access memory (RAM) 53, and an interface 54 are disposed. The ROM 52, the RAM 53, and the interface 54 are connected to the CPU 51. The CPU 51 controls the overall portable game machine, and the ROM 52 stores programs for execution by the CPU 51, target game rules, game image data, etc. The RAM 53 serves as a work area for the CPU 51 while executing data processing.

The interface 54 serves as an input/output connecting circuit for the CPU 51. The input unit 20, the speaker 30, and the display unit 40 are connected to the CPU 51 via the interface 54. Accordingly, operation information which is generated in response to the operation performed on the input unit 20 is input into the CPU 51 via the interface 54, and image information to be displayed on the display unit 40 and sound information to be output to the speaker 30, both kinds of information being generated by the CPU 51, are output to the display unit 40 and the speaker 30, respectively, via the interface 54.

Figure 3:
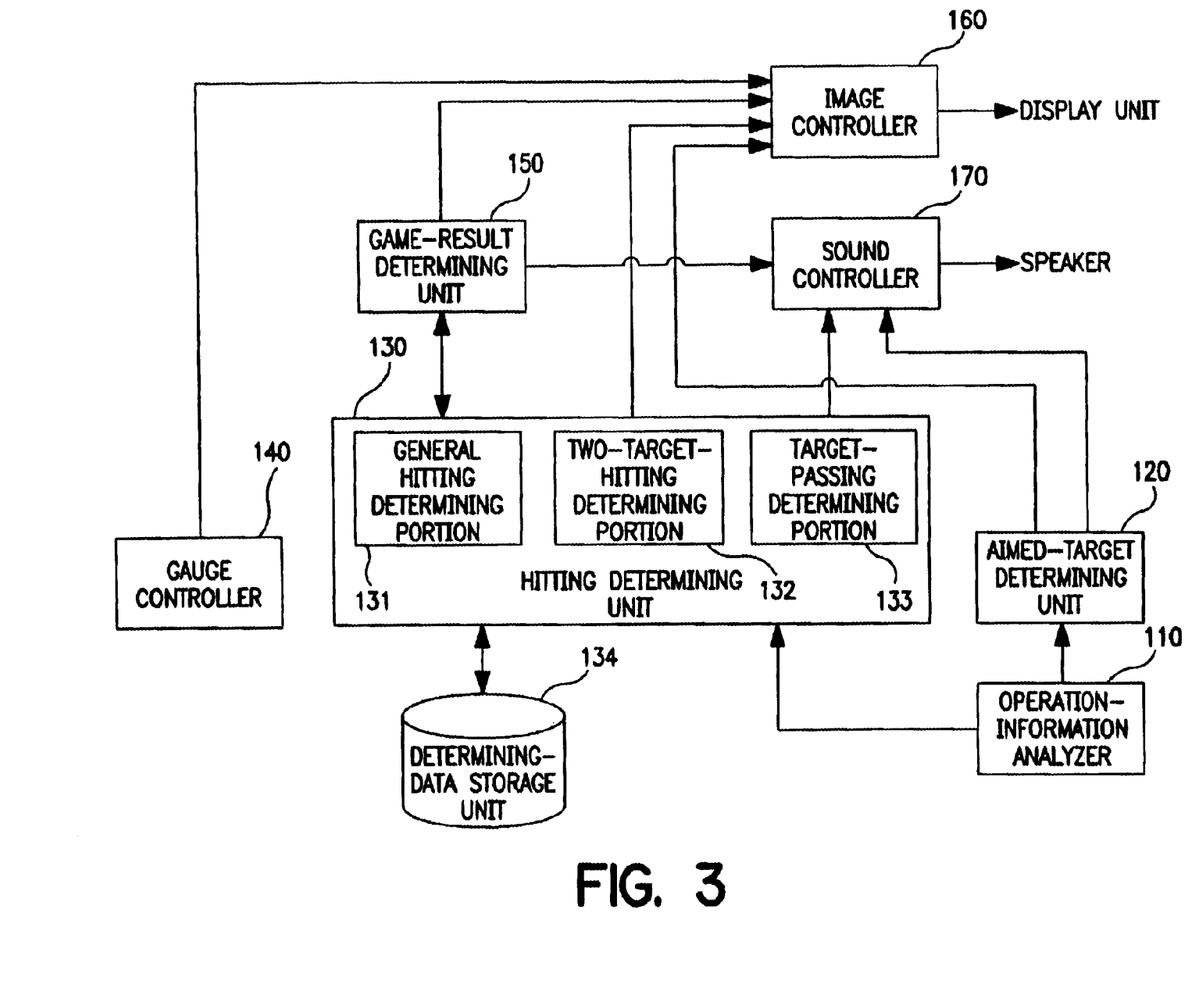
FIG. 3 is a block diagram illustrating the functional blocks generated in the portable game machine shown in FIG. 1.

Upon supplying power, functional blocks, such as the ones shown in FIG. 3, are generated within the portable game machine. That is, an operation-information analyzer 110, an aimed-target determining unit 120, a hitting determining unit 130, a gauge controller 140, a game-result determining unit 150, an image controller 160, and a sound controller 170 are created, thereby forming a game processing unit used in the invention of this application.

The operation-information analyzer 110 is connected to the input unit 20 via the interface 54 and is also connected to the aimed-target determining unit 120 and the hitting determining unit 130. The operation-information analyzer 110 analyzes the operation information input from the input unit 20 and transfers it to the aimed-target determining unit 120 and the hitting determining unit 130.

Based on the information from the operation-information analyzer 110, the aimed-target determining unit 120 determines which target of M1 through M9 (see FIG. 5) is aimed at by a game player, and sends the corresponding information to the image controller 160 and the sound controller 170.

The hitting determining unit 130 determines, based on the information from the operation-information analyzer 110, whether a ball kicked by the game player has hit the target of M1 through M9 determined by the aimed-target determining unit 120. The hitting determining unit 130 includes a general hitting determining portion 131, a two-target-hitting determining portion 132, and a target-passing determining portion 133. The general hitting determining portion 131 determines whether a ball kicked by the player has hit the aimed target or one of the other targets M1 through M9. The two-target-hitting determining portion 132 determines whether the ball has hit two targets. The target-passing determining portion 133 determines whether the ball has passed one of the targets M1 through M9 which has been hit before. The determination results are then sent to the game-result determining unit 150, the image controller 160, and the sound controller 170 connected to the hitting determining unit 130. In making the determinations, the hitting determining unit 130 utilizes parameters stored in a determining-data storage unit 134 connected to the hitting determining unit 130.

The game-result determining unit 150 compares the number of preset balls, the number of balls kicked by the player, and the number of targets M1 through M9 hit by the player, and then determines the success or the failure of the game.

More specifically, when all the targets M1 through M9 have been hit, the game-result determining unit 150 determines that the game is a success. When the number of remaining balls is below the number of targets M1 through M9 left, the game-result determining unit 150 determines that the game is a failure. Otherwise, the game-result determining unit 150 determines that the player should continue the game. The game result determined by the game-result determining unit 150 is sent to the image controller 160 and the sound controller 170.

The gauge controller 140 controls the display of gauges 70X and 70Y used for presenting information as a guide for the player for operating the input unit 20. The gauge controller 140 is connected to the image controller 160 and sends information required for displaying the gauges 70X and 70Y on the display unit 40 to the image controller 160.

As stated above, both the image controller 160 and the sound controller 170 are connected to the aimed-target determining unit 120, the hitting determining unit 130, the gauge controller 140, and the game-result determining unit 150, and receive data concerning the progress of the game from the above-described elements. The image controller 160 displays the states of the targets M1 through M9 and the kicking motion according to the input information, and the sound controller 170 outputs a corresponding sound.

The target game of the present invention is executed by the above-constructed portable game machine by the following process.

Figure 4:
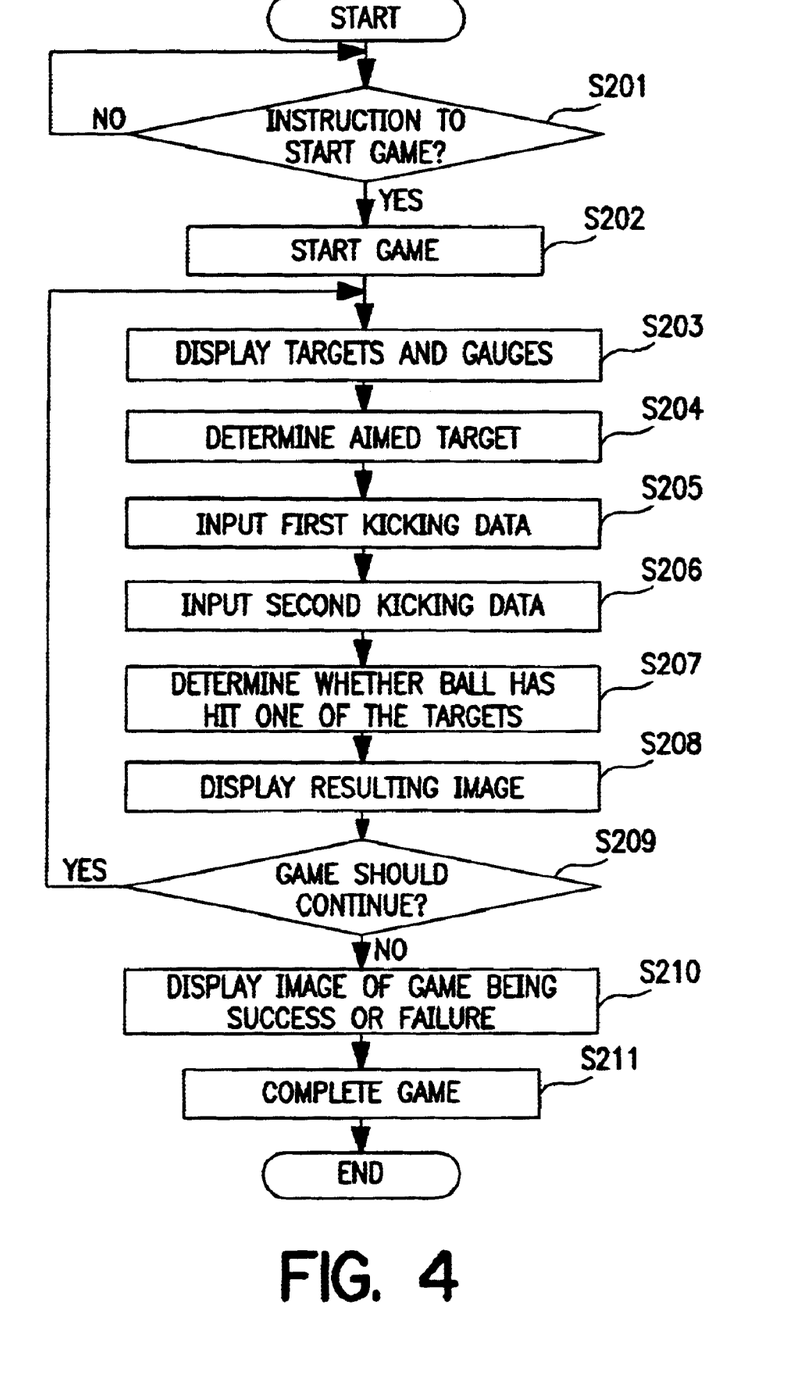
FIG. 4 is a flow chart illustrating the progress of a game executed on the portable game machine shown in FIG. 1.

FIG. 4 illustrates the overall process of the target-game execution method. At the start of the game, the game title and a demonstration screen are displayed on the display unit 40. Upon inputting an instruction to start the game from the input unit 20 in step S201, the game is started in step S202. More specifically, if any one of the operation keys 21, 22, and 23 is operated, it is determined that an instruction to start the game has been provided. If there is no input in step S201, the process returns to START.

Figure 5:
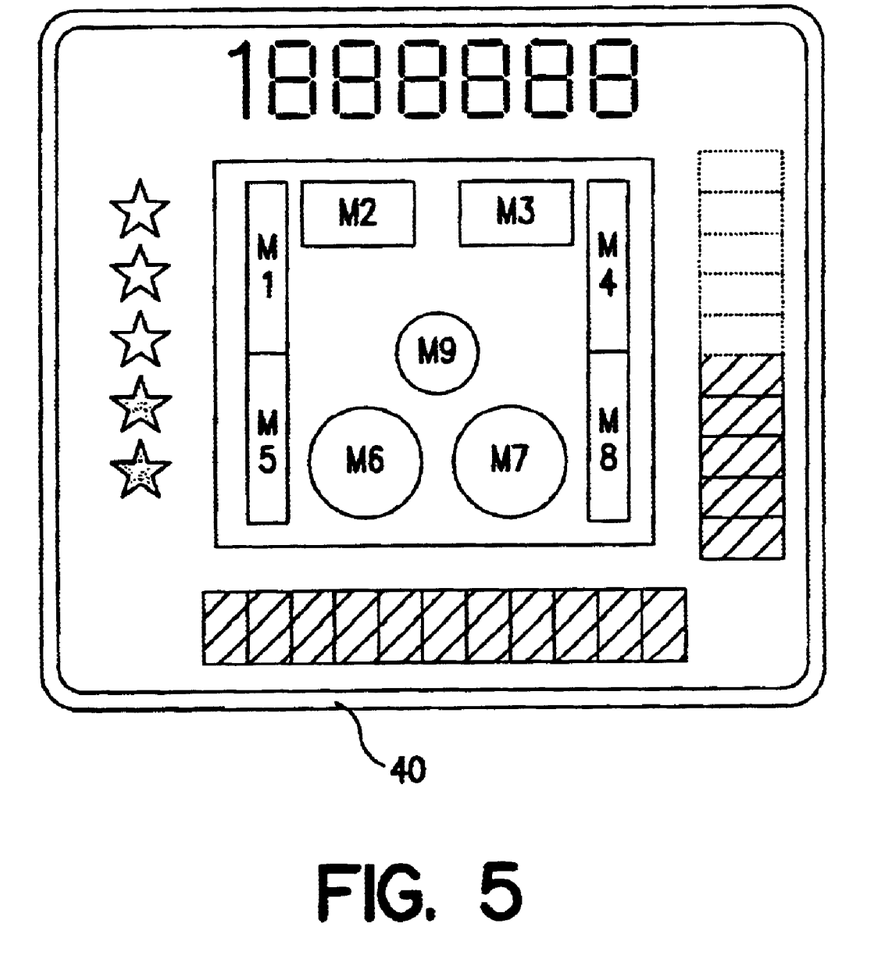
FIG. 5 is a front view illustrating an example of a display unit when the game is executed on the portable game machine shown in FIG. 1.

After starting the game, in step S203, not only the score and the game level, but also the targets M1 through M9 and the gauges 70X and 70Y, are displayed on the display unit 40, as illustrated in FIG. 5. Outside the targets M1 through M9, an angular U-shaped portion, which simulates a football goal mouth, is displayed, and this makes the player feel as if a ball kicked by the player passes through one of the targets M1 through M9, thereby enhancing the atmosphere of the game. The gauge 70X is formed by continuously and linearly arranging eleven small regions 71, and the gauge 70Y is formed by continuously and linearly arranging ten small regions 71. The gauges 70X and 70Y are displayed along two adjacent sides of the display unit 40. One dot forming the dot-matrix-type liquid crystal display 40 is assigned to each region 71 (see FIG. 5).

Subsequently, in step S204, the target of M1 to M9 to be aimed at is determined. Numbers 1 through 9 are assigned to the targets M1 through M9, respectively, substantially from the top left to the bottom right (indicated by M1 through M9 in FIG. 5).

The selection of the aimed target of M1 through M9 is performed as follows. In this embodiment, by operating the operation key 21 disposed at the left side of the housing 10, the aimed target is changed by decreasing the number, and by operating the operation key 23 disposed at the right side of the housing 10, the aimed target is changed by increasing the number. With this arrangement, the player is able to select the aimed target of M1 through M9 by operating the operation keys 21 and 23. The aimed target is displayed by inverting the color of the other targets so that it can be distinguished from the other targets. The operation key 22 disposed at the bottom portion of the housing 10 is used as a setting key. Thus, by pressing the operation key 22 after selecting the aimed target of M1 to M9, the player is able to set the aimed target.

When the aimed target is set, information suggesting the timing at which the first kicking data is input to the player is provided on the gauge 70X.

Figure 6:
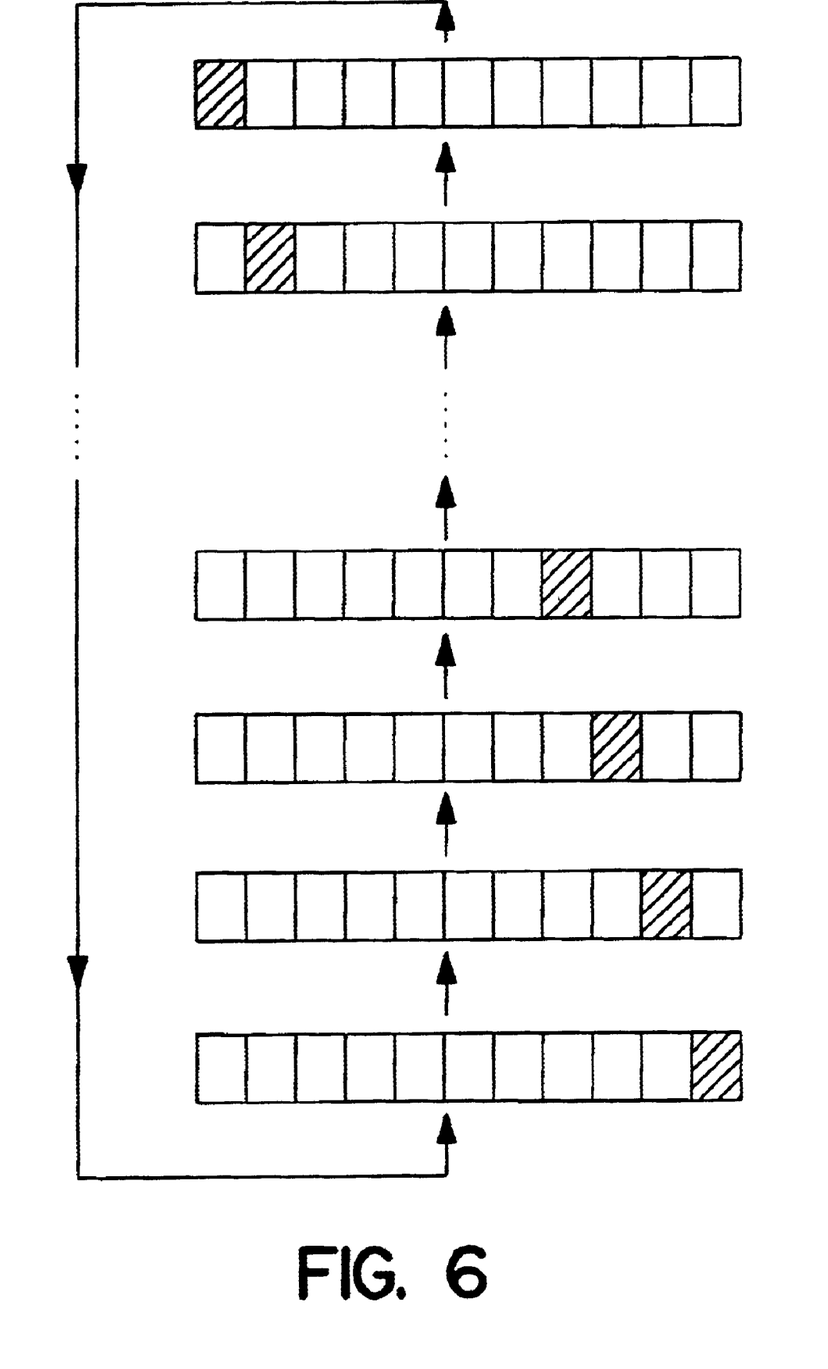
FIG. 6 illustrates an information providing method by using gauges.

This timing information can be provided by sequentially displaying the small regions 71 of the gauge 70X, as shown in FIG. 6. More specifically, the rightmost small region 71 within the gauge 70X Is first displayed in black and the other small regions 71 are displayed in white. Then, the second rightmost region 71 is inverted into black, and the other regions 71 are displayed in white. Similarly, the small regions 71 are sequentially inverted into black from right to left. After the leftmost region 71 has been inverted into black, the rightmost region 71 is again inverted into black. The small region 71 inverted into black is a designated region. By repeating this display operation, the timing information is provided. While this information is being provided, in step S205, the player inputs the first kicking data by operating the input unit 20, and more specifically, by operating one of the operation keys 21, 22, and 23. The first kicking data in this embodiment determines the X coordinate (the horizontal direction in FIG. 5) when the kicked ball reaches one of the targets M1 through M9. The value of the first kicking data is determined by the position of the designated region when the player inputs the timing by operating one of the operation keys 21, 22, and 23. More specifically, it is determined by the number of the designated region counted from the rightmost region 71 when the input unit 20 is operated. For example, if the second region 71 counted from the rightmost region 71 is designated, the first kicking data is 2. If there is no input by the player within a predetermined time limit, the first kicking data is determined by the designated position when the time limit elapses.

Upon inputting the first kicking data, information concerning the timing at which the second kicking data is input is provided by the gauge 70Y. The second kicking data is provided in a manner similar to the first kicking data. More specifically, the bottommost region 71 within the gauge 70Y Is first displayed in black, and the other regions 71 are displayed in white. Then, the second bottommost region 71 is inverted into black, and the other regions 71 are displayed in white. Likewise, the small regions 71 are sequentially inverted into black from bottom to top. As in the case of the gauge 70X, the region 71 inverted into black is a designated region. While this information is being provided, in step S206, the player inputs the second kicking data by operating the input unit 20, and more specifically, by operating one of the operation keys 21, 22, and 23. The second data in this embodiment determines the Y coordinate (the vertical direction in FIG. 5) when the kicked ball has reached one of the targets M1 through M9. The value of the second kicking data is determined by the position of the designated region when the player inputs the timing by operating one of the operation keys 21, 22, and 23. More specifically, it is determined by the number of the designated region counted from the bottommost region 71. For example, if the fourth region 71 counted from the bottommost region 71 has been designated, the second kicking data is 4. If the time limit elapses, the second kicking data is determined in a manner similar to the first kicking data.

Figure 7:
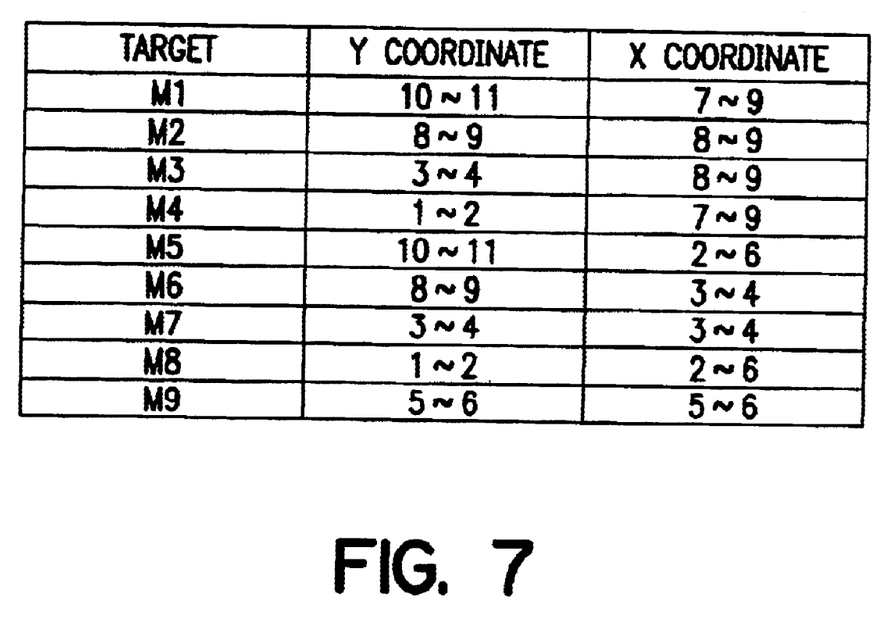
FIG. 7 illustrates examples of the coordinate values of targets.

After the first kicking data and the second kicking data have been input, the hitting determining unit 130 determines in step S207 whether the ball has hit one of the targets M1 through M9. More specifically, the hitting determining unit 130 first compares the preset coordinates indicating the targets M1 through M9 with the coordinates when the ball reaches one of the targets M1 through M9 determined by the first kicking data and the second kicking data. If the coordinates when the ball reaches the target are contained in one of the coordinates of the targets M1 through M9, the hitting determining unit 130 determines that the ball has hit one of the targets M1 through M9. This determination is made by the general hitting determining portion 131. In this embodiment, the coordinates of the targets M1 through M9 are preset to the values shown in FIG. 7, and are stored in the determining-data storage unit 134. In the above-described example, since the first kicking data is 2 and the second kicking data is 4, it is determined that the ball hits the target M8. If, however, the target M8 has already been hit, it is determined that the ball passes through the target M8. This determination is made by the target-passing determining portion 133. In this kicking game, it is determined that the ball hits the target regardless of whether the ball hits the aimed target or one of the other targets M1 through M9. In this case, it may be set that a higher score can be obtained when the ball has hit the aimed target than the other targets. Thus, the game player can be motivated by trying to correctly input the first kicking data and the second kicking data, thereby making the game more entertaining.

The two-target-hitting determining portion 132 determines whether the ball hits two adjacent targets of M1 through M9. In this embodiment, two adjacent targets connected to each other are only two combinations, such as M1 and M5, and M4 and M8. Accordingly, the two-target-hitting determining portion 132 determines whether the ball reaches a boundary position between the targets M1 and M5, or M4 and M8. In this embodiment, it is set that the ball hits the targets M1 and M5 when the coordinates X and Y of the targets when the ball hits are (10, 6), and the ball hits the targets M4 and M8 when the coordinates X and Y of the targets when the ball hits are (2, 6). In the aforementioned example, since the first kicking data is 2 and the second kicking data is 4, it is determined that the ball has not hit two adjacent targets.

While the above-described determination is being made, animation representing the ball being flying toward the target is shown on the display unit 40.

In step S208, according to the result determined by the hitting determining unit 130, a corresponding image indicating that the ball hits one of the targets M1 through M9, the ball misses the targets, or the ball hits two targets is displayed. To further enhance the reality of the game and entertaining characteristics, images of hitting the aimed target, two adjacent targets, etc. are preferably shown. If the ball hits a target other than the aimed target, a word, such as "LUCKY!", is displayed on the display unit 40.

After the above-described processing, in step S209, the game-result determining unit 150 determines whether the target game has resulted in success or failure, or whether the result of the game cannot be determined yet, in other words, whether the game should continue. More specifically, if all the targets M1 through M9 have been hit, the game is found to be a success. If the number of the remaining targets M1 through M9 exceeds the number of remaining balls, the game is found to be a failure. In the other cases, it is determined that the game should continue. Concerning the number of balls when the game is started, about twelve balls are preferably provided, considering the number of targets M1 through M9 (nine).

In step S210, if it is determined that the game has resulted in success, animation indicating, for example, the football player looking happy, or a word, such as "PERFECT", blinking, is displayed, thereby making the player more enthusiastic about the game. On the other hand, if it is determined that the game has resulted in failure, an image showing the football player crying, or words, such as "YOU LOST, TRY AGAIN!", may be indicated. In step S211, the game is then completed.

In the aforementioned embodiment, the game execution method executed in a portable game machine is described. However, the present invention may be used in general-purpose computers, such as personal computers, or home-use game machines. For example, program code recorded in recording media, such as CD-ROMs and DVDs, may be installed and executed in a computer, or may be directly read and executed by a computer through the recording media loaded in the computer. Then, functional blocks similar to those formed of the operation-information analyzer 110, the aimed-target determining unit 120, the hitting determining unit 130, the gauge controller 140, the game-result determining unit 150, the image controller 160, and the sound controller 170 shown in FIG. 3, may be formed in the computer. It is thus possible to execute a game similar to that of the aforementioned embodiment.

In this case, it is not necessary to form the above-described functional blocks only by the code recorded in the recording media, and the program code may cooperate with an operating system (OS) within the computer or with another application to form the functional blocks.

As is seen from the foregoing description, according to the target-game execution method of the present invention, highly entertaining target games can be executed on game machines, and such game machines can be differentiated from other types of game machines and are thus desirable. This target-game execution method can be implemented by simple rules and is thus executable on portable game machines having high restrictions imposed on storage units. Additionally, by reading computer-readable program code recorded on recording media, this game execution method can be executed on general-purpose computers and home-use game machines.

What is claimed is:

1. A target-game execution method for use in a portable game machine which comprises input means operated by a game player, game processing means for executing game processing based on an operation input from said input means, and display means for providing an execution result executed by said game processing means to the game player, said target-game execution method comprising the steps of:

displaying a plurality of targets on said display means;

determining by said game processing means by using first kicking data and second kicking data successively input by the game player through said input means, one of the first kicking data and the second kicking data being used as information concerning an X coordinate when the ball reaches one of the targets, and the other of the first kicking data and the second kicking data being used as information concerning a Y coordinate when the ball reaches one of the targets, whether a ball hits one of the plurality of targets defined by the X coordinate and the Y coordinate;

displaying gauges on said display means, each of said gauges being formed by continuously arranging a plurality of small regions in a predetermined direction;

displaying timing information on said gauges as a guide for the game player for inputting the first kicking data and the second kicking data, wherein said gauges are located on said display means so that one of said gauges is in parallel to the X axis and the other gauge is in parallel to the Y axis, and the first kicking data and the second kicking data are determined by positions of the designated regions within said gauges when the game player operates said input means; and displaying a resulting image of the target on said display means after the ball has been kicked based on a determination result obtained by said game processing means.

2. A target-game execution method according to claim 1, wherein, when the X coordinate and the Y coordinate obtained when the ball hits the target represent a boundary between adjacent targets which have not been hit before, said game processing means determines that the ball hits the adjacent targets.

3. A target-game execution method according to claim 1 further comprising the steps of:

selecting an aimed target by the game player through said input means; and displaying an image indicating the game player's luck on said display means when a target other than the aimed target is hit.

4. A target-game execution method according to claim 1 wherein, when the ball reaching the target determined by the first kicking data and the second kicking data is positioned within a target which has been hit before, an image indicating that the ball has passed through the target is displayed on said display means.

5. A target-game execution method according to claim 3, wherein, when the ball reaching the target determined by the first kicking data and the second kicking data is positioned within a target which has been hit before, an image indicating that the ball has passed through the target is displayed on said display means.

6. A target-game execution method according to claim 1, wherein the timing information is displayed in such a manner that a designated region is shifted on said gauges by successively displaying the plurality of small regions of said gauges.

7. A target-game execution method according to claim 1, further comprising the steps of:

determining by said game processing means when all the targets have been hit within a predetermined limited number of balls, and determining that the game is a failure when not all the targets have been hit within the predetermined limited number of balls; and displaying an image representing the success of the game when the game is found to be a success.

8. A game machine comprising:

input means operated by a game player;

game processing means for executing game processing based on an operation input from said input means; and display means for providing an execution result executed by said game processing means to the game player, wherein said game processing means displays a plurality of targets on said display means, and determines by using first kicking data and second kicking data input by the game player through said input means, one of the first kicking data an the second kicking data being used as information concerning an X coordinate when a ball reaches one of the targets, and the other data being used as information concerning a Y coordinate when the ball reaches one of the targets, whether the ball hits one of the targets defined by the X coordinate and the Y coordinate, displaying gauges on said display means, each of said gauges being formed by continuously arranging a plurality of small regions in a predetermined direction; displaying timing information on said gauges as a guide for the game player for inputting the first kicking data and the second kicking data, wherein said gauges are located on said display means so that one of said gauges is in parallel to the X axis and the other gauge is in parallel to the Y axis, and the first kicking data and the second kicking data are determined by positions of the designated regions within said gauges when the game player operates said input means, and said game processing means displays a resulting image of the target on said display means after the ball has been kicked based on a determination result obtained by said game processing means.

9. A game machine according to claim 8, wherein said input means, said game processing means, and said display means are contained in a portable housing.

10. A computer-readable recording medium in which program code for operating a computer as a game machine is recorded, said computer including predetermined display means and input means operated by a game player, said program code causing said computer to execute the steps comprising:

displaying a plurality of targets on said display means;

determining by using first kicking data and second kicking data successively input by the game player through said input means, one of the first kicking data and the second kicking data being used as information concerning an X coordinate when a ball reaches one of the targets, and the other data being used as information concerning a Y coordinate when the ball reaches one of the targets, whether a ball hits one of the plurality of targets defined by the X coordinate and the Y coordinate;

displaying gauges on said display means, each of said gauges being formed by continuously arranging a plurality of small regions in a predetermined direction;

displaying timing information on said gauges as a guide for the game player for inputting the first kicking data and the second kicking data, wherein said gauges are located on said display means so that one of said gauges is in parallel to the X axis and the other gauge is in parallel to the Y axis, and the first kicking data and the second kicking data are determined by positions of the designated regions within said gauges when the game player operates said input means; and displaying a resulting image of the target on said display means after the ball has been kicked based on a determination result obtained by said game processing means.

11. A target-game execution method for use in a portable game machine which comprises input means operated by a game player, game processing means for executing game processing based on an operation input from said input means, and display means for providing an execution result executed by said game processing means to the game player, said target-game execution method comprising the steps of:

displaying a plurality of targets on said display means;

determining by said game processing means by using first kicking data and second kicking data successively input by the game player through said input means, one of the first kicking data and the second kicking data being used as information concerning an X coordinate when the ball reaches one of the targets, and the other of the first kicking data and the second kicking data being used as information concerning a Y coordinate when the ball reaches one of the targets, whether a ball hits one of the plurality of targets defined by the X coordinate and the Y coordinate wherein, when the X coordinate and the Y coordinate obtained when the ball hits the target represent a boundary between adjacent targets which have not been hit before, said game processing means determines that the ball hits the adjacent targets;

displaying gauges on said display means, each of said gauges being formed by continuously arranging a plurality of small regions in a predetermined direction;

displaying timing information on said gauges as a guide for the game player for inputting the first kicking data and the second kicking data, wherein said gauges are located on said display means so that one of said gauges is in parallel to the X axis and the other gauge is in parallel to the Y axis, and the first kicking data and the second kicking data are determined by positions of the designated regions within said gauges when the game player operates said input means; and displaying a resulting image of the target on said display means after the ball has been kicked based on a determination result obtained by said game processing means wherein, when the ball reaching the target determined by the first kicking data and the second kicking data is positioned within a target which has been hit before, an image indicating that the ball has passed through the target is displaced on said display means.

* * * * *